(12) United States Patent
Ai et al.

(10) Patent No.: US 11,644,009 B2
(45) Date of Patent: May 9, 2023

(54) METHOD AND APPARATUS FOR DETECTING YAW-TO-WIND ABNORMALITY, AND DEVICE AND STORAGE MEDIUM THEREOF

(71) Applicants: ENVISION DIGITAL INTERNATIONAL PTE. LTD., Singapore (SG); SHANGHAI ENVISION DIGITAL CO., LTD., Shanghai (CN)

(72) Inventors: Yong Ai, Shanghai (CN); Qingsheng Zhao, Shanghai (CN); Zhongji Yin, Shanghai (CN); Shu Wei, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/783,178

(22) PCT Filed: Dec. 8, 2020

(86) PCT No.: PCT/SG2020/050725
§ 371 (c)(1),
(2) Date: Jun. 7, 2022

(87) PCT Pub. No.: WO2021/118461
PCT Pub. Date: Jun. 17, 2021

(65) Prior Publication Data
US 2023/0012218 A1    Jan. 12, 2023

(30) Foreign Application Priority Data
Dec. 9, 2019    (CN) .......................... 201911252551.6

(51) Int. Cl.
F03D 7/02    (2006.01)
F03D 17/00    (2016.01)

(52) U.S. Cl.
CPC ........... *F03D 7/0204* (2013.01); *F03D 17/00* (2016.05); *F05B 2270/321* (2013.01); *F05B 2270/335* (2013.01); *F05B 2270/802* (2013.01)

(58) Field of Classification Search
CPC .. F03D 7/0204; F03D 17/00; F05B 2270/321; F05B 2270/335; F05B 2270/802
See application file for complete search history.

(56) References Cited

U.S. PATENT DOCUMENTS

2012/0185414 A1*  7/2012  Pyle ........................ G01W 1/10
                                                        703/2
2018/0355846 A1   12/2018  Nielsen
(Continued)

FOREIGN PATENT DOCUMENTS

CN    109667727 A    4/2019
CN    110094310 A    8/2019
(Continued)

OTHER PUBLICATIONS

Xie, Peng, "A method for identifying wind yawing the wind malocclusion", Aug. 6, 2019 (Year: 2019).*
(Continued)

*Primary Examiner* — Woody A Lee, Jr.
*Assistant Examiner* — Joshua R Beebe
(74) *Attorney, Agent, or Firm* — JCIP; Joseph G. Chu; Jeremy I. Maynard

(57) ABSTRACT

Disclosed are a method and apparatus for detecting a yaw-to-wind abnormality. The method includes: acquiring a wind direction deviation angle within a specified time period; calculating a power performance index, wherein the power performance index is a dimensionless number used to characterize power generation performance of a wind turbine; determining an optimal wind direction deviation angle based on the power performance index; determining a current wind direction deviation angle according to probability distribution of the wind direction deviation angle; and if a difference between the optimal wind direction deviation angle and the current wind direction deviation angle is greater than a
(Continued)

preset threshold, determining that a yaw-to-wind abnormality is detected. Compared with the related technology in which yaw-to-wind detection is performed through a power fitting curve, in the technical solution according to the embodiments of the present disclosure, a power index is directly used, which avoids the problem of poor power curve fitting effect and improves the accuracy of yaw-to-wind detection.

9 Claims, 7 Drawing Sheets

(56) References Cited

U.S. PATENT DOCUMENTS

2018/0363625 A1 12/2018 Nielsen
2020/0088171 A1* 3/2020 Göldner ............... F03D 17/00
2020/0362816 A1* 11/2020 Xue .................. F03D 7/0204

FOREIGN PATENT DOCUMENTS

JP 2009243428 A 10/2009
WO 2019165743 A1 9/2019

OTHER PUBLICATIONS

International Search Report and Written Opinion of International Searching Authority dated Mar. 30, 2021 for International Application No. PCT/SG2020/050725.
Written Opinion of IPEA dated Dec. 3, 2021 for International Application No. PCT/SG2020/050725.
International Preliminary Report on Patentability dated Mar. 4, 2022 for International Application No. PCT/SG2020/050725.
Extended European Search Report dated Jan. 5, 2023 for European Application No. 20898907.9.

* cited by examiner

METHOD AND APPARATUS FOR DETECTING YAW-TO-WIND ABNORMALITY, AND DEVICE AND STORAGE MEDIUM THEREOF

TECHNICAL FIELD

Embodiments of the present disclosure relate to the technical field of wind power generation, and in particular, relate to a method and apparatus for detecting a yaw-to-wind abnormality, and a device, and a storage medium thereof.

BACKGROUND

Yaw-to-wind misalignment is a common phenomenon in wind turbines. Problems such as yaw-to-wind misalignment and large yaw errors may not only lead to a decrease in the generation capacity of the unit, but also affect stability and safety of units of the turbines.

In related arts, yaw deviation is analyzed by a division method. That is, different wind angles are divided at certain intervals. Then power curve fitting is performed in different angular intervals. The different angular intervals are compared in terms of performance of the power curve. An interval where the power curve is optimal is used as a yaw deviation angle.

In the above related arts, due to the limitation of the data volume, fitting the power curve in each interval may result in no power output in some wind speed intervals, which may further lead to a poor fitting effect of the final power curve, thereby making the final yaw detection inaccurate.

SUMMARY

Embodiments of the present disclosure provide a method and apparatus for detecting a yaw-to-wind abnormality, and a device and a storage medium thereof.

According to a first aspect of the embodiments of the present disclosure, a method for detecting a yaw-to-wind abnormality is provided. The method includes:

acquiring a wind direction deviation angle within a specified time period, wherein the wind direction deviation angle is an angle defined between a wind direction and a central axis of a nacelle of a wind turbine;

calculating a power performance index, wherein the power performance index is a dimensionless number to characterize power generation performance of the wind turbine;

determining an optimal wind direction deviation angle based on the power performance index, wherein the optimal wind direction deviation angle is a wind direction deviation angle corresponding to optimal power generation performance of the wind turbine within the specified time period;

determining a current wind direction deviation angle according to probability distribution of the wind direction deviation angle, wherein the current wind direction deviation angle is a wind direction deviation angle with a greatest probability of occurrence within the specified time period; and determining that the yaw-to-wind abnormality is detected if a difference between the optimal wind direction deviation angle and the current wind direction deviation angle is greater than a preset threshold.

According to a second aspect of the embodiments of the present disclosure, an apparatus for detecting a yaw-to-wind abnormality is provided. The apparatus includes:

a deviation angle acquiring module, configured to acquire a wind direction deviation angle within a specified time period, wherein the wind direction deviation angle is an angle defined between a wind direction and a central axis of a nacelle of a wind turbine;

an index calculating module, configured to calculate a power performance index, wherein the power performance index is a dimensionless number to characterize power generation performance of the wind turbine;

a first determining module, configured to determine an optimal wind direction deviation angle based on the power performance index, wherein the optimal wind direction deviation angle is a wind direction deviation angle corresponding to optimal power generation performance of the wind turbine within the specified time period;

a second determining module, configured to determine a current wind direction deviation angle according to probability distribution of the wind direction deviation angle, wherein the current wind direction deviation angle is a wind direction deviation angle with a greatest probability of occurrence within the specified time period; and a result determining module, configured to determine that a yaw-to-wind abnormality is detected if a difference between the optimal wind direction deviation angle and the current wind direction deviation angle is greater than a preset threshold.

According to a third aspect of the embodiments of the present disclosure, a computer device is provided. The computer device includes a processor and a memory storing at least one instruction, at least one program, a code set or an instruction set therein. The at least one instruction, the at least one program, the code set or the instruction set, when loaded and executed by the processor, causes the processor to perform the steps of the method described in the first aspect.

According to a fourth aspect of the embodiments of the present disclosure, a non-transitory computer-readable storage medium storing at least one computer program therein is provided. The computer program, when loaded and run by a processor, causes the processor to perform the steps of the method described in the first aspect.

The technical solutions according to the embodiments of the present disclosure may achieve the following beneficial effects.

A power performance index is calculated, an optimal wind direction deviation angle is determined based on the power performance index, a current wind direction deviation angle is determined according to probability distribution of the wind direction deviation angle, and then whether a yaw-to-wind abnormality is detected is determined. Compared with the related technology in which yaw-to-wind detection is performed through a power fitting curve, in the technical solutions according to the embodiments of the present disclosure, a power index is directly used, which avoids the problem of poor power curve fitting effect and improves the accuracy of yaw-to-wind detection.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the description, illustrate embodiments of the present invention and, together with the description thereof, serve to explain the principles of the present invention.

DETAILED DESCRIPTION

Figure 1:
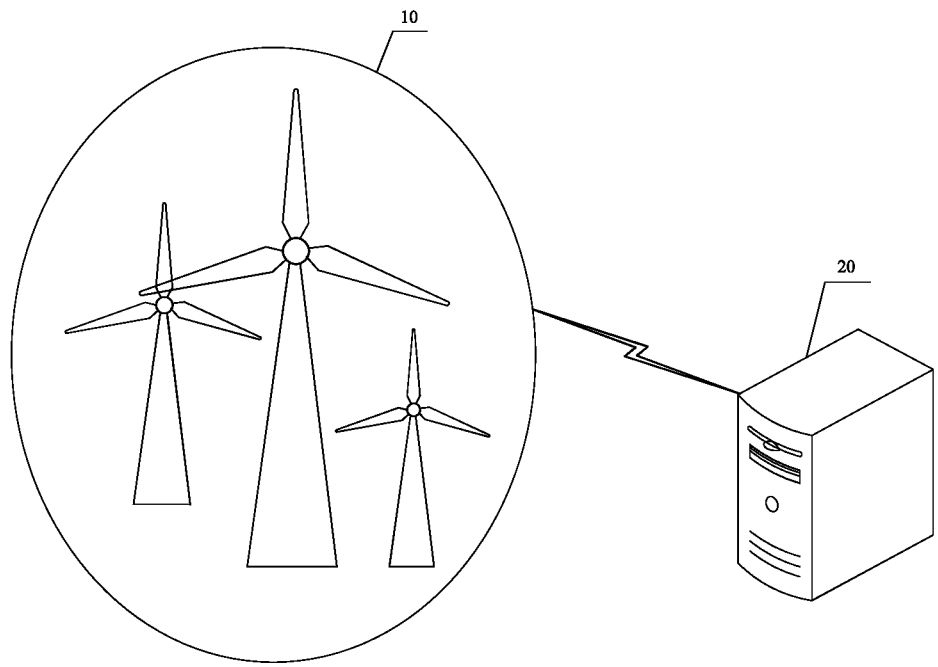
FIG. 1 is a schematic diagram of an implementation environment according to an exemplary embodiment.

Exemplary embodiments are described in detail hereinafter, and examples thereof are shown in the drawings. When the following description refers to the figures, unless otherwise indicated, the same numbers in different figures represent the same or similar elements. The implementations described in the following exemplary embodiments do not represent all implementations consistent with the present disclosure. Rather, they are only examples of apparatuses and methods consistent with some aspects of the present disclosure as detailed in the appended claims.

FIG. 1 is a schematic diagram of an implementation environment according to an exemplary embodiment. The implementation environment may include a wind turbine 10 and a computer device 20.

The wind turbine 10 may include a base, a tower, a nacelle, a hub, and blades (wind mills). The base is to provide a foundation of the wind turbine to maintain the stability of the wind turbine. The wind center of the wind turbine needs to be installed at a certain height, and the tower is a structure that provides this height. The nacelle is mainly composed of a glass fiber reinforced plastic nacelle cover, a main frame, a yaw system, a generator set, a gear box, a brake, a frequency converter, a weather station, and other accessories. The hub is mainly composed of a variable pitch motor, a reducer, a variable pitch control cabinet, a slip ring, a lightning protection wire and other components. The blade is mainly composed of a blade longitudinal beam, a blade shell made of suitable materials, a blade root, an embedded bolt flange, and a blade lightning protection and flashover.

Operating parameters of the wind turbine 10 may be acquired through a supervisory control and data acquisition (SCADA) system. The acquired operating parameters may include wind speed, rotor speed, blade pitch angle, yaw angle, active power, wind turbine operating status, and the like. The acquisition method may be to dispose a sensor at a corresponding position of the wind turbine.

After the operating parameters of the wind turbine 10 are acquired, the operating parameters may be sent to the computer device 20 for yaw-to-wind abnormality detection. The computer device 20 refers to an electronic device with data calculation, processing, and storage capabilities. The computer device may be, for example, a personal computer (PC) or a server. There may be one or more computer devices 20. For example, when there are two computer devices (such as a first computer device and a second computer device), the first computer device may be a private network server that directly transmits data with the SCADA system, and the second computer device may be a public network server. The first computer device may further send data to the second computer device.

Optionally, after the computer device 20 performs yaw-to-wind abnormality detection, if it detects a yaw-to-wind abnormality, it may also generate warning information, which is used to indicate the yaw-to-wind abnormality, and send the warning information to a warning device such that the maintenance personnel can find and correct the abnormality in time.

In related technologies, a yaw-to-wind abnormality being detected by means of power curve fitting has the following problems: Due to the limitation of the data volume, there will be no power output in some wind speed intervals, resulting in discontinuity of power curve fitting, and a complete power curve cannot be obtained; and due to the particularity of the work of the wind turbine, the power output is noisy and the data is dirty, and it is difficult to perform complete data cleaning and acquire a good power output point, resulting in poor effect of power curve fitting. Considering the above problems, the final yaw detection is not accurate.

Figure 2:
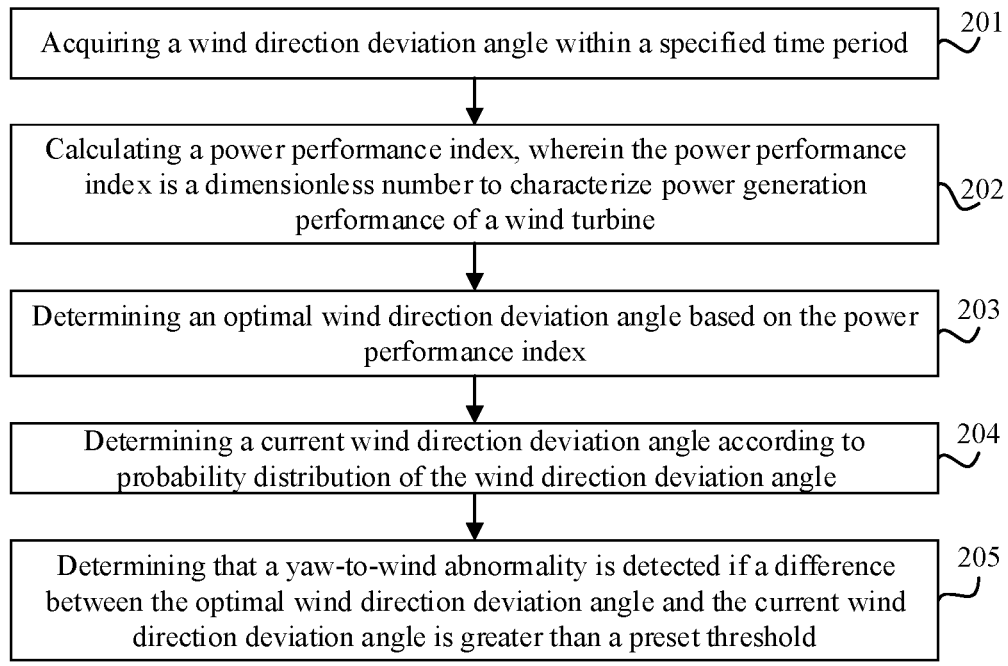
FIG. 2 is a flowchart of a method for detecting a yaw-to-wind abnormality according to an exemplary embodiment.

FIG. 2 is a flowchart of a method for detecting a yaw-to-wind abnormality according to an exemplary embodiment. In this embodiment, this method is mainly applied to the computer device shown in the embodiment of FIG. 1. The method may include the following steps (201-205).

In step 201, a wind direction deviation angle within a specified time period is acquired.

The wind direction deviation angle is an angle defined between a wind direction and a central axis of a wind turbine.

The specified time period may be any period of time, and may be selected according to actual conditions, which is not limited in the embodiment of the present disclosure.

In an optional embodiment, all wind direction deviation angles within the specified time period may be acquired.

An energy source of a wind turbine is wind energy captured by a wind mill of the wind turbine. In the case of accurate yawing, a central axis of the wind turbine is parallel to a wind direction, an angle therebetween is 0°, the wind energy captured is the largest, and the wind turbine has the best power generation performance. However, due to inevitable errors in the manufacturing, installation, and debugging processes of the wind vane, the wind turbine cannot yaw accurately, resulting in a decrease in the power generation performance of the wind turbine. Therefore, the wind turbine needs to yaw based on the wind direction deviation angle to improve the power generation performance of the wind turbine.

Figure 3:
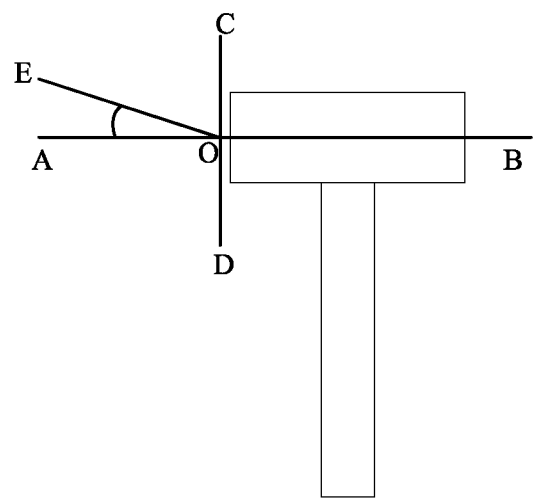
FIG. 3 exemplarily shows a schematic diagram of a wind direction deviation angle.

FIG. 3 exemplarily shows a schematic diagram of a wind direction deviation angle. In the figure, a straight line AOB represents a central axis of a wind turbine nacelle. A straight line COD represents a wind mill plane. A straight line EO represents a wind direction. A wind direction deviation angle is an angle defined between the central axis AOB and the wind direction EO.

In an optional embodiment, the wind direction deviation angle may be directly measured, or may be calculated through a geometric quantitative relationship between the wind direction, the central axis value of the nacelle, and the deviation angle defined between the wind direction and the nacelle axis. The wind direction deviation angle is equal to a difference between the position value of the nacelle and the wind direction.

In step 202, a power performance index is calculated. The power performance index is a dimensionless number to characterize power generation performance of the wind turbine.

The power performance index may be calculated based on operating parameters of the wind turbine, such as wind speed, generator speed, and power.

The power performance index is a dimensionless number to characterize power generation performance of the wind turbine. A dimensionless quantity is often written as a product or ratio of two dimensional quantities, but the final dimensional quantities eliminate each other to obtain a dimensionless quantity. Using dimensionless numbers for analysis can effectively simplify the analysis process and reduce complexity.

In step 203, an optimal wind direction deviation angle is determined based on the power performance index.

After the power performance index is acquired, an optimal wind direction deviation angle may be determined based on the power performance index. The optimal wind direction deviation angle is a wind direction deviation angle corresponding to optimal power generation performance of the wind turbine within the specified time period.

In step 204, a current wind direction deviation angle is determined according to probability distribution of the wind direction deviation angle.

The wind direction deviation angle may be statistically collected, and a current wind direction deviation angle may be determined according to probability distribution of the wind direction deviation angle. The current wind direction deviation angle is a wind direction deviation angle with the greatest probability of occurrence within the specified time period.

In step 205, if a difference between the optimal wind direction deviation angle and the current wind direction deviation angle is greater than a preset threshold, it is determined that a yaw-to-wind abnormality is detected.

Further, a difference between the optimal wind direction deviation angle and the current wind direction deviation angle may be acquired. If the difference is greater than a preset threshold, it is determined that a yaw-to-wind abnormality is detected. After that, the maintenance personnel can perform yaw correction.

In addition, when the difference between the optimal wind direction deviation angle and the current wind direction deviation angle is less than the preset threshold, it means that the yaw deviation has no significant influence and no correction is required.

The preset threshold may be set by the maintenance personnel according to actual conditions, which is not limited in the embodiment of the present disclosure.

In summary, in the technical solution according to the embodiments of the present disclosure, a power performance index is calculated, an optimal wind direction deviation angle is determined based on the power performance index, a current wind direction deviation angle is determined according to probability distribution of the wind direction deviation angle, and then whether a yaw-to-wind abnormality is detected is determined. Compared with the related technology in which yaw-to-wind detection is performed through a power fitting curve, in the technical solution according to the embodiments of the present disclosure directly, a power index is directly used, which avoids the problem of poor power curve fitting effect and improves the accuracy of yaw-to-wind detection.

Figure 4:
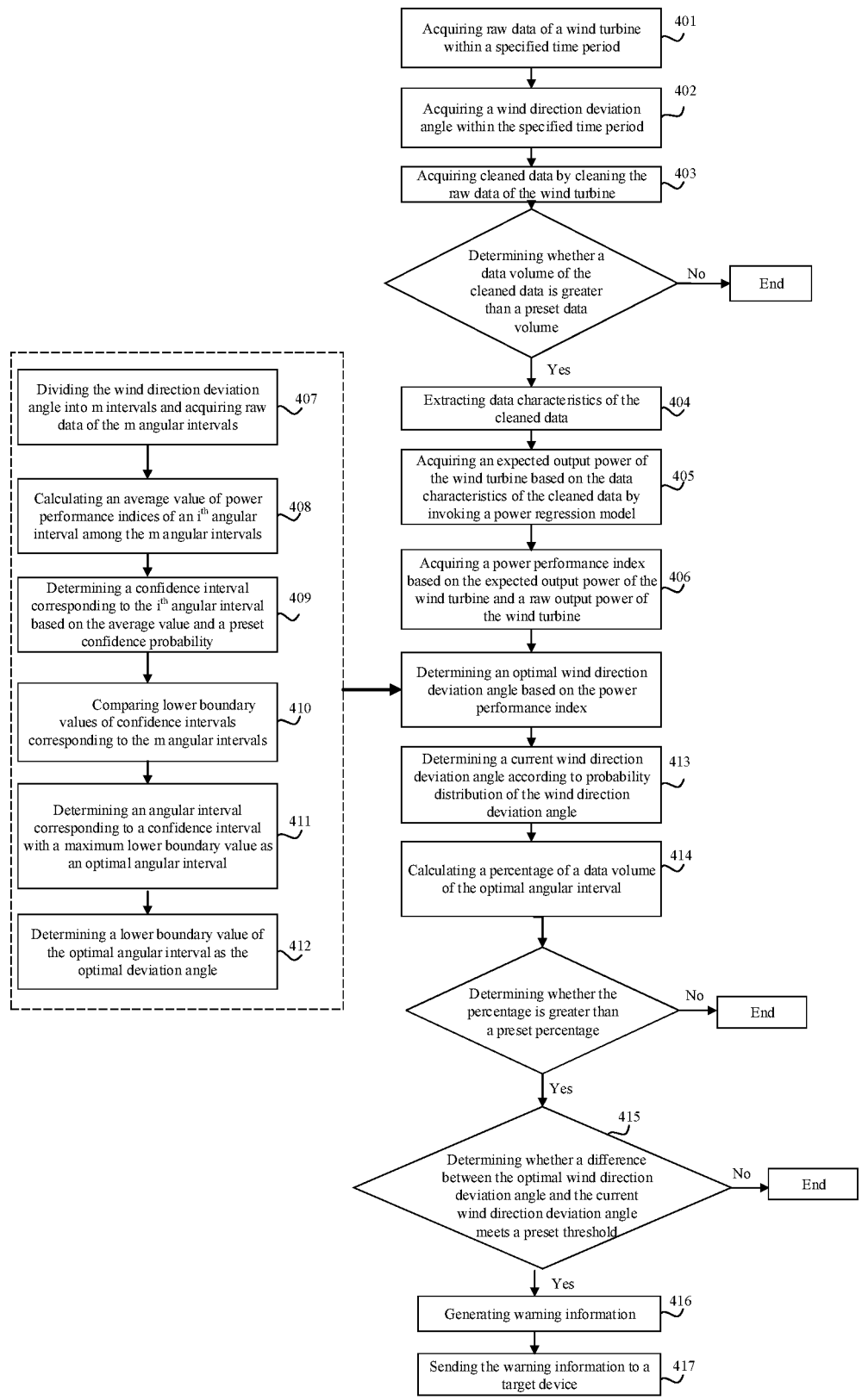
FIG. 4 is a flowchart of another method for detecting a yaw-to-wind abnormality according to an exemplary embodiment.

FIG. 4 is a flowchart of another method for detecting a yaw-to-wind abnormality according to an exemplary embodiment. In this embodiment, this method is mainly applied to the computer device shown in the embodiment of FIG. 1. The method may include the following steps (401-417).

In step 401, raw data of a wind turbine within a specified time period is acquired.

The raw data of the wind turbine includes operating parameters of the wind turbine, including a raw output power of the wind turbine. In addition, the raw data of the wind turbine also includes environmental data of the wind turbine and operating data of adjacent wind turbines.

The operating data of the wind turbine refers to relevant data during the operation of the wind turbine, such as wind vane angle (i.e., the deviation angle defined between the wind direction and the nacelle), nacelle position, generator speed, pitch angle, active power, gear box oil temperature, and unit operating status. The environmental data of the wind turbine refers to characteristic data of an environment where the wind turbine is installed, such as turbulence intensity, wind direction, ambient temperature, and wind speed. The operating data of adjacent wind turbines refers to operating data of other wind turbines adjacent to the wind turbine, such as output power, blade angle, generator speed, and wind mill speed of the adjacent wind turbines.

In step 402, a wind direction deviation angle within the specified time period is acquired.

After the raw data of the wind turbine is acquired, a wind direction deviation angle may be further acquired based on the raw data of the wind turbine.

This step is the same as or similar to step 201 in the embodiment of FIG. 2, which is not repeated herein.

In an optional embodiment, after acquiring the raw data of the wind turbine, step 403 may be performed.

In step 403, cleaned data is acquired by cleaning the raw data of the wind turbine.

The cleaning is to remove abnormal data in the raw data of the wind turbine. The abnormal data may include at least one of: stuck data, overrun data, and data that does not conform to physical principles. In addition, the abnormal data may also include artificially interpolated and modified data.

The stuck data refers to data that has the same value or fluctuates within a small range within a period of time. The overrun data refers to data that exceeds a reasonable range of generation power of the wind turbine power generation data under certain wind speed conditions. The data that does not conform to physical principles may include icing data. The icing data refers to data that causes poor wind turbine power generation performance due to icing of the wind turbine due to weather. In addition, the data that does not conform to physical principles may also include other data, which is not limited in the embodiment of the present disclosure.

Figure 5:
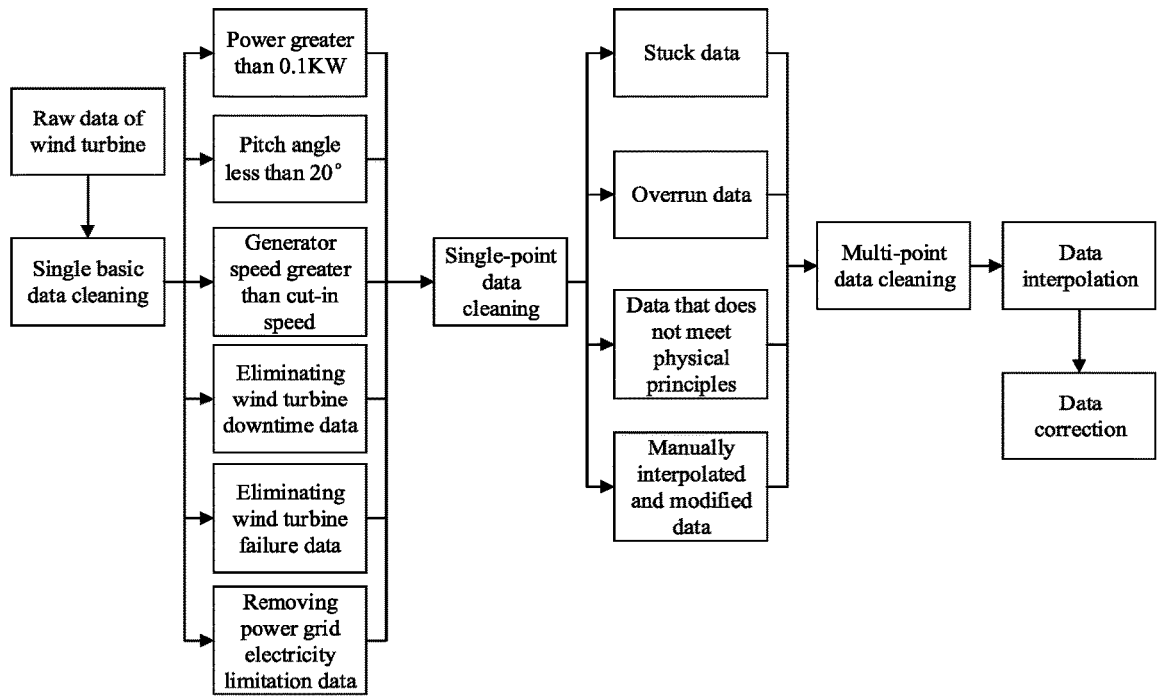
FIG. 5 exemplarily shows a schematic diagram of a processing process of raw data.

FIG. 5 exemplarily shows a schematic diagram of a processing process of the raw data. The data cleaning may also refer to the IEC standard. The valid data criteria formulated are as follows: (1) the power is greater than 0.1 KW; (2) the pitch angle is less than 20°; (3) the generator speed is greater than the cut-in speed; (4) the non-wind speed is less than 10 m/s and the pitch angle is greater than 5°; (5) the wind direction angle is less than 15° and greater than −15°; (6) non-downtime; (7) non-failure time; and (8) non-wind curtailment time.

In an optional embodiment, still referring to FIG. 5, acquiring the cleaned data by cleaning the raw data of the wind turbine includes the following operations.

(1) The cleaned data is acquired by single-point cleaning the raw data of the wind turbine.

In the single-point cleaning, only target data is taken into consideration in detecting whether the target data is abnormal. For example, when detecting whether power data is abnormal, other related parameters are not taken into consideration, and only whether the power data meets the standard is taken into consideration.

(2) The cleaned data is acquired by multi-point cleaning the raw data of the wind turbine to.

In the multi-point cleaning, both target data and at least one piece of other data are taken into consideration in detecting whether the target data is abnormal. For example, when detecting whether power data is abnormal, not only whether the power data meets the standard is taken into consideration, but also whether the wind speed meets the standard is taken into consideration. The power data and the wind speed are combined to make a comprehensive judgment.

It should be noted that the cleaning of the raw data of the wind turbine may be only the single-point cleaning or only the multi-point cleaning, or both the single-point cleaning and the multi-point cleaning, which is not limited in the embodiment of the present disclosure.

In an optional embodiment, still referring to FIG. 5, after acquiring the cleaned data by cleaning the raw data of the wind turbine, the method further includes the following operations.

(1) Interpolation is Performed on the Cleaned Data.

In view that after data cleaning, data incompletion may lead to inaccurate analysis, data interpolation may be performed to fill in missing data.

(2) The Cleaned Data is Corrected.

In data correction, the wind speed of the wind turbine is corrected based on the environmental data of the wind turbine. In view of the influence of environmental factors, atmospheric pressure, ambient temperature, air density, and the like may all cause an impact on the wind speed, such that data correction may be performed on the cleaned data to reduce the impact of environmental factors on the data.

In an optional embodiment, after acquiring the cleaned data by cleaning the raw data of the wind turbine, whether a data volume of the cleaned data is greater than a preset data volume may also be determined. If the data volume of the cleaned data is greater than the preset data volume, step 404 may be performed. If the data volume of the cleaned data is less than the preset data volume, considering that the data volume is too small for accurate analysis, no subsequent analysis is performed.

In step 404, data characteristics of the cleaned data are extracted.

After the raw data of the wind turbine is cleaned, data characteristics of the cleaned data may also be extracted.

In step 405, an expected output power of the wind turbine is acquired based on the data characteristics of the cleaned data by invoking a power regression model.

After the data characteristics of the cleaned data are acquired, a power regression model may be invoked to calculate an expected output power of the wind turbine.

Figure 6:
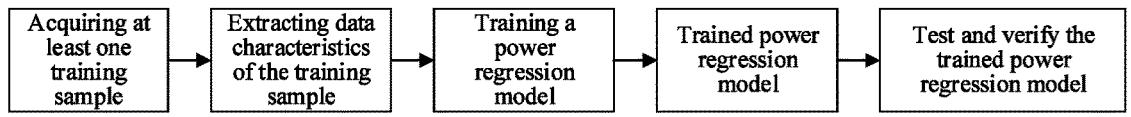
FIG. 6 exemplarily shows a schematic diagram of a training process of a power regression model.

In an optional embodiment, as shown in FIG. 6, the power regression model is trained by the following steps.

(1) At least one training sample is acquired, which includes the raw data of the wind turbine.

(2) Data characteristics of the training sample are extracted.

(3) A trained power regression model is acquired by training the power regression model with the data characteristics of the training sample, and adjusting the parameters of the power regression model.

After a training sample is acquired, data characteristics of the training sample may be extracted, such as characteristics of the operating data of the wind turbine, characteristics of the environmental data of the wind turbine, and characteristics of the operating data of adjacent wind turbines. After that, characteristic construction is performed based on the above data characteristics. The power regression model is trained with the constructed characteristics. The parameters of the power regression model are gradually adjusted and a trained power regression model is acquired.

In an optional embodiment, when the power regression model satisfies a training stop condition, the training of the model is stopped to obtain a trained power regression model. The training stop condition of the power regression model may be preset, such as a value of a loss function reaching a preset threshold, the number of training rounds reaching a preset number of rounds, or a training duration reaching a preset duration, etc., which is not limited in the embodiment of the present disclosure.

In an optional embodiment, after the training is completed, the trained power regression model may be tested and verified with a test set. After passing the verification, the power regression model is pushed on line such that other devices may invoke it when needed.

It should be noted that the power regression model may be a random forest regression (RF) model, a gradient boosting decision tree (GBDT) model, or extreme gradient boosting (XGBoost) model. In addition, it may also be other models, which is not limited in the embodiment of the present disclosure.

In step 406, a power performance index is acquired based on the expected output power of the wind turbine and the raw output power of the wind turbine.

The raw data includes the raw output power of the wind turbine. After the expected output power of the wind turbine is acquired, a power performance index may be further calculated in combination with the raw output power of the wind turbine.

The power performance index is a dimensionless number to characterize the power generation performance of the wind turbine. In the embodiment of the present disclosure, the power performance index may be a ratio of the raw output power of the wind turbine to the expected output power of the wind turbine. If the power performance index is greater than 1, the power generation performance of the wind turbine exceeds the expected output power of the wind turbine. If the power performance index is less than 1, the power generation performance of the wind turbine does not reach the expected output power of the wind turbine.

In some other embodiments, the power performance index may also be other parameters that can express the power performance obtained by mathematical operations such as addition, subtraction, multiplication, and division between the raw output power of the wind turbine and the expected output power of the wind turbine. The calculation method may be freely configured as long as it conforms to physical principles, which is not limited in the embodiments of the present disclosure.

In step 407, the wind direction deviation angle is divided into m angular intervals, wherein m is a positive integer greater than 1.

After the wind direction deviation angle is acquired, the angle may be divided into intervals. That is, the wind direction deviation angle is divided into m angular intervals according to a preset interval, wherein m is a positive integer greater than 1. Each angular interval includes at least one wind direction deviation angle which corresponds to the power performance index one by one.

Figure 7:
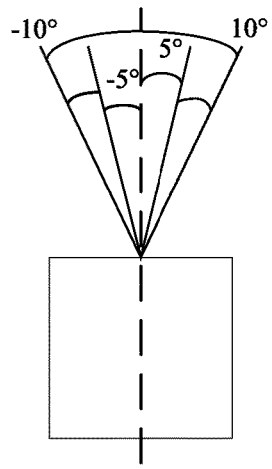
FIG. 7 exemplarily shows a schematic diagram of a the wind direction deviation angle being divided into intervals.

FIG. 7 exemplarily shows a schematic diagram of the wind direction deviation angle being divided into intervals. Assuming that the wind direction deviation angle is [−10°, 10°] and the preset interval is 5°, the wind direction deviation angle may be divided into 4 angular intervals.

In step 408, an average value of power performance indices of an $i^{th}$ angular interval among the m angular intervals is calculated.

Since the value of the data and the amount of data in each angular interval are not the same, after acquiring multiple power performance indices of each angular interval, an average value of the power performance indices of each angular interval may be calculated for subsequent analysis.

In step 409, a confidence interval corresponding to the $i^{th}$ angular interval is determined based on the average value and a preset confidence probability.

After an average value of the power performance of each angular interval is acquired, a confidence interval corresponding to each angular interval may be determined in combination with a preset confidence probability.

In an optional embodiment, the confidence interval is determined through the student's t distribution. It is assumed that the preset confidence probability is 95%. When the average value of the power performance of the $i^{th}$ angular interval is obtained, a variance of the power performance of the $i^{th}$ angular interval may also be obtained. In combination with the average value and the variance, a degree of freedom table of the t distribution is queried to determine a corresponding degree of freedom. An upper boundary value and a lower boundary value of a confidence interval with a confidence probability below 95% may be further calculated, thereby determining a confidence interval corresponding to the $i^{th}$ angular interval.

In step 410, lower boundary values of confidence intervals corresponding to the m angular intervals are compared.

By step 409, a confidence interval corresponding to each of the m angular intervals may be obtained, and on this basis, a lower boundary value of the confidence interval corresponding to each angular interval may be compared.

In step 411, an angular interval corresponding to a confidence interval with a maximum lower boundary value is determined as the optimal angular interval.

By comparing the lower boundary values of the confidence intervals corresponding to the m angular intervals, in view of the stability and reliability of the data, an angular interval corresponding to a confidence interval with a maximum lower boundary value may be determined as the optimal angular interval. The optimal angular interval is an angular interval which the optimal deviation angle falls within.

In step 412, a lower boundary value of the optimal angular interval is determined as the optimal deviation angle.

The optimal angular interval includes an upper boundary value and a lower boundary value. After the optimal angular interval is determined, a lower boundary value of the optimal angular interval may be determined as the optimal deviation angle.

In an optional embodiment, assuming that the optimal angular interval is [0.5°, 1°), 0.5° may be used as the optimal deviation angle.

In step 413, a current wind direction deviation angle is determined according to probability distribution of the wind direction deviation angle.

In an optional embodiment, an angular interval with a maximum probability value among the m angular intervals may be determined as the current deviation angle; or, an angular interval corresponding to a median of the wind direction deviation angles of the m angular intervals may be determined as the current deviation angle.

In an optional embodiment, after determining the current wind direction deviation angle according to the probability distribution, step 414 may also be performed.

In step 414, a percentage of a data volume of the optimal angular interval is calculated.

After the optimal angular interval is determined, a percentage of a data volume of the optimal angular interval may be calculated. The percentage is a ratio of the data volume of the optimal angular interval to a data volume of the raw data of the optimal angular interval.

If the percentage is less than a preset percentage, the analysis ends.

If the percentage is greater than the preset percentage, step 415 may be performed.

In step 415, whether a difference between the optimal deviation angle and the current deviation angle meets a preset threshold is determined.

A difference between the optimal wind direction deviation angle and the current wind direction deviation angle is acquired. If the difference is greater than a preset threshold, it is determined that a yaw-to-wind abnormality is detected. After that, the maintenance personnel can perform yaw correction.

In step 416, warning information is generated.

After it is determined that a yaw-to-wind abnormality is detected, warning information may be generated to indicate the yaw-to-wind abnormality.

In step 417, the warning information is sent to a target device.

The target device may be a warning device in the implementation environment as shown in FIG. 1. The warning device may issue a warning upon receiving the warning information sent by the computer device, such that the maintenance personnel can correct the yaw.

In summary, in the technical solution according to the embodiments of the present disclosure, a power performance index is calculated, an optimal wind direction deviation angle is determined based on the power performance index, a current wind direction deviation angle is determined according to probability distribution of the wind direction deviation angle, and then whether a yaw-to-wind abnormality is detected is determined. Compared with the related technology in which yaw-to-wind detection is performed through a power fitting curve, in the technical solution according to the embodiments of the present disclosure, a power index is directly used, which effectively improves the yaw detection accuracy of the wind turbine for timely device maintenance and avoids the continuous drop in power generation performance and reduces the loss of power generation. Moreover, the calculation is fast, without a lot of data to fit the power curve, and the analysis efficiency is high.

In addition, by more in-depth data cleaning, the data cleaning effect is improved, and errors caused by poor data cleaning effects may be greatly reduced.

Hereinafter are apparatus embodiments of the present disclosure for implementing the method embodiments of the present disclosure. For details that are not disclosed in the apparatus embodiments of the present disclosure, reference may be made to the method embodiments of the present disclosure.

Figure 8:
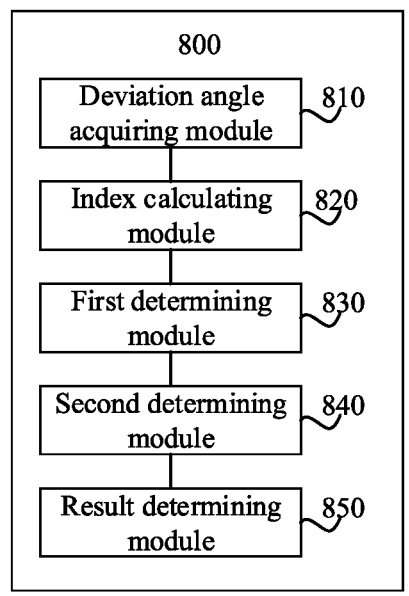
FIG. 8 is a block diagram of an apparatus for detecting a yaw-to-wind abnormality according to an exemplary embodiment.

FIG. 8 is a block diagram of an apparatus for detecting a yaw-to-wind abnormality according to an exemplary embodiment. The apparatus has a function of implementing the method embodiments. The function may be realized by hardware, or by hardware executing corresponding software. The apparatus may be a computer device, or may be disposed on the computer device. The apparatus 800 may include a deviation angle acquiring module 810, an index calculating module 820, a first determining module 830, a second determining module 840, and a result determining module 850.

The deviation angle acquiring module 810 is configured to acquire a wind direction deviation angle within a specified time period. The wind direction deviation angle is an angle defined between a wind direction and a central axis of a wind turbine.

The index calculating module 820 is used to calculate a power performance index. The power performance index is a dimensionless number to characterize power generation performance of the wind turbine.

The first determining module 830 is configured to determine an optimal wind direction deviation angle based on the power performance index. The optimal wind direction deviation angle is a wind direction deviation angle corresponding to optimal power generation performance of the wind turbine within the specified time period.

The second determining module 840 is configured to determine a current wind direction deviation angle according to probability distribution of the wind direction deviation angle. The current wind direction deviation angle is a wind direction deviation angle with a greatest probability of occurrence within the specified time period.

The result determining module 850 is configured to determine that a yaw-to-wind abnormality is detected if a difference between the optimal wind direction deviation angle and the current wind direction deviation angle is greater than a preset threshold.

In summary, in the technical solution according to the embodiments of the present disclosure, a power performance index is calculated, an optimal wind direction deviation angle is determined based on the power performance index, a current wind direction deviation angle is determined according to probability distribution of the wind direction deviation angle, and then whether a yaw-to-wind abnormality is detected is determined. Compared with the related technology in which yaw-to-wind detection is performed through a power fitting curve, the technical solution according to the embodiments of the present disclosure, a power index is directly used, which avoids the problem of poor power curve fitting effect and improves the accuracy of yaw-to-wind detection.

Figure 9:
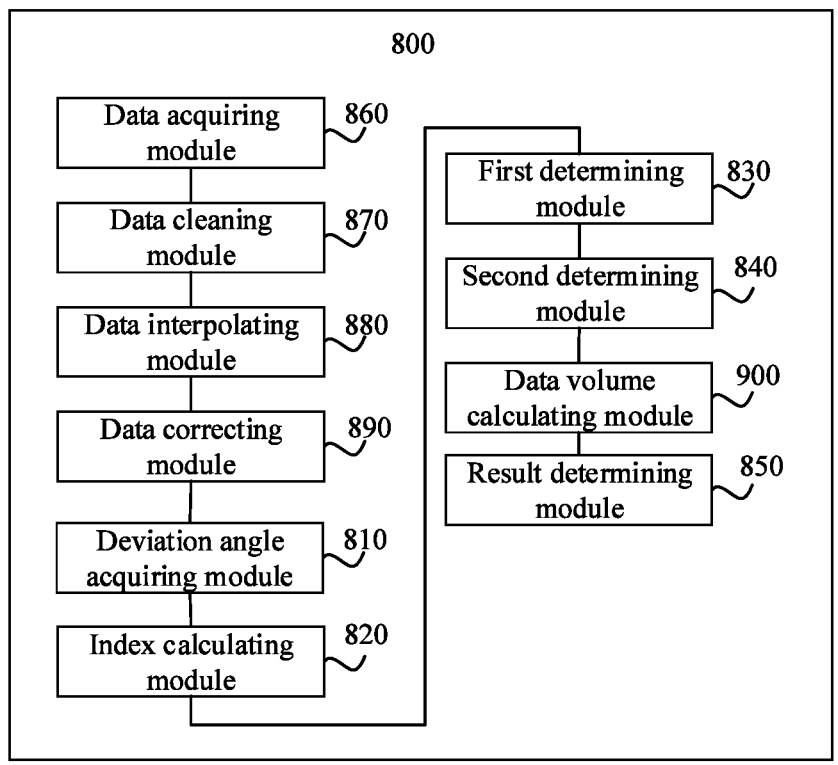
FIG. 9 is a block diagram of an apparatus for detecting a yaw-to-wind abnormality according to another exemplary embodiment.

In some embodiments, as shown in FIG. 9, the apparatus 800 may further include a data acquiring module 860.

The data acquiring module 860 is configured to acquire raw data of the wind turbine. The raw data of the wind turbine includes operating data of the wind turbine, environmental data of the wind turbine, and operating data of adjacent wind turbines. The operating data of the wind turbine includes a raw output power of the wind turbine.

The index calculating module 820 is configured to extract data characteristics of the raw data; acquire an expected output power of the wind turbine based on the data characteristics of the raw data of the wind turbine by invoking a power regression model; and acquire the power performance index based on the expected output power of the wind turbine and the raw output power of the wind turbine.

In some embodiments, as shown in FIG. 9, the apparatus 800 may further include a data cleaning module 870.

The data cleaning module 870 is configured to acquire cleaned data by cleaning the raw data of the wind turbine. The cleaning is to remove abnormal data in the raw data of the wind turbine. The abnormal data includes at least one of: stuck data, overrun data, and data that does not conform to physical principles.

The index calculating module 820 is configured to acquire the expected output power of the wind turbine based on the data characteristics of the raw data of the wind turbine by invoking the power regression model if a data volume of the cleaned data is greater than a preset data volume.

In some embodiments, the data cleaning module 870 is used to acquire the cleaned data by single-point cleaning the raw data of the wind turbine, wherein in the single-point cleaning, only target data is taken into consideration in detecting whether the target data is abnormal; and/or acquire the cleaned data by multi-point cleaning the raw data of the wind turbine, wherein in the multi-point cleaning, both target data and at least one piece of other data are taken into consideration in detecting whether the target data is abnormal.

In some embodiments, as shown in FIG. 9, the apparatus 800 further includes a data interpolating module 880 and a data correcting module 890.

The data interpolating module 880 is configured to fill missing data by interpolation on the cleaned data; and/or the data correcting module 890 is configured to correct the wind speed of the wind turbine based on the environmental parameters of the wind turbine by correcting the cleaned data.

In some embodiments, the first determining module 830 is configured to: divide the wind direction deviation angle into m angular intervals, wherein m is a positive integer greater than 1, and each angular interval includes at least one wind direction deviation angle one-to-one corresponding to the power performance index; calculate an average value of power performance indices of an $i^{th}$ angular interval among the m angular intervals; determine a confidence interval corresponding to the $i^{th}$ angular interval based on the average value and a preset confidence probability; compare power boundary values of confidence intervals corresponding to the m angular intervals; determine an angular interval corresponding to a confidence interval with a maximum lower boundary value as an optimal angular interval, wherein the optimal angular interval is an angular interval which the optimal deviation angle falls within; and determine a lower boundary value of the optimal angular interval as the optimal deviation angle.

In some embodiments, the second determining module 840 is configured to determine an angular interval with a maximum probability value among the m angular intervals as the current deviation angle; or determine an angular interval corresponding to a median of the wind direction deviation angles of the m angular intervals as the current deviation angle.

In some embodiments, as shown in FIG. 9, the apparatus 800 further includes a data volume calculating module 900.

The data volume calculating module 900 is configured to calculate a percentage of a data volume of the optimal angular interval.

The result determining module 850 is configured to determine whether the difference between the optimal deviation angle and the current deviation angle meets the preset threshold if the percentage is greater than a preset percentage.

It should be noted that when the apparatus according to the above embodiment implements its functions, only the division of the above functional modules is taken for illustration. In practice, the above functions may be allocated to different functional modules as needed. Namely, the internal structure of the device is divided into different functional modules to complete all or part of the functions described above. In addition, the apparatus provided in the above embodiments belong to the same concept and as the method embodiments, and for the specific implementation process thereof, reference may be made to the method embodiments, which is not repeated herein.

Figure 10:
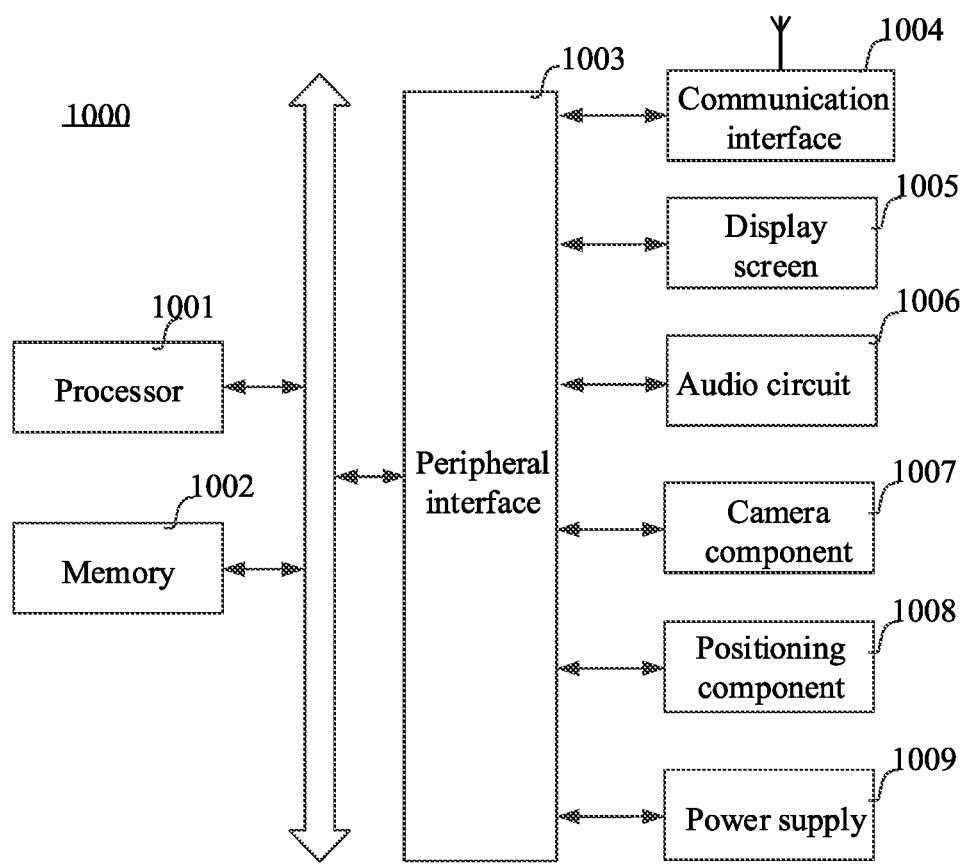
FIG. 10 is a structural block diagram of a terminal according to an embodiment of the present disclosure.

FIG. 10 shows a structural block diagram of a terminal according to an embodiment of the present disclosure. Generally, the terminal 1000 includes a processor 1001 and a memory 1002.

The processor 1001 may include one or more processing cores, such as a 4-core processor, an 8-core processor, and so on. The processor 1001 may be implemented in at least one hardware form of a digital signal processor (DSP), a field programmable gate array (FPGA), and a programmable logic array (PLA). The processor 1001 may also include a main processor and a coprocessor. The main processor is a processor used to process data in an awake state, also called a central processing unit (CPU). The coprocessor is a low-power processor used to process data in a standby state. In some embodiments, the processor 1001 may be integrated with a graphics processing unit (GPU). The GPU is used to render and draw content that needs to be displayed on a display screen. In some embodiments, the processor 1001 may further include an Artificial Intelligence (AI) processor. The AI processor is used to deal with calculation operations related to machine learning.

The memory 1002 may include one or more computer-readable storage medium, which may be non-transitory. The memory 1002 may also include a high-speed random access memory and a non-volatile memory, such as one or more magnetic disk storage devices and flash memory storage devices. In some embodiments, the non-transitory computer-readable storage medium in the memory 1002 is used to store at least one instruction. The at least one instruction is used to be executed by the processor 1001 to implement the method for detecting a yaw-to-wind abnormality according to the method embodiments of the present disclosure.

In some embodiments, the terminal 1000 may optionally further include a peripheral interface 1003 and at least one peripheral. The processor 1001, the memory 1002, and the peripheral interface 1003 may be connected by a bus or a signal line. Each peripheral may be connected to the peripheral interface 1003 through a bus, a signal line, or a circuit board. Specifically, the peripheral may include at least one of a communication interface 1004, a display screen 1005, an audio circuit 1006, a camera component 1007, a positioning component 1008, and a power supply 1009.

Those skilled in the art may understand that the structure shown in FIG. 10 does not constitute a limitation on the terminal 1000, and may include more or fewer components than shown in the figure, or combine certain components, or adopt different component arrangements.

Figure 11:
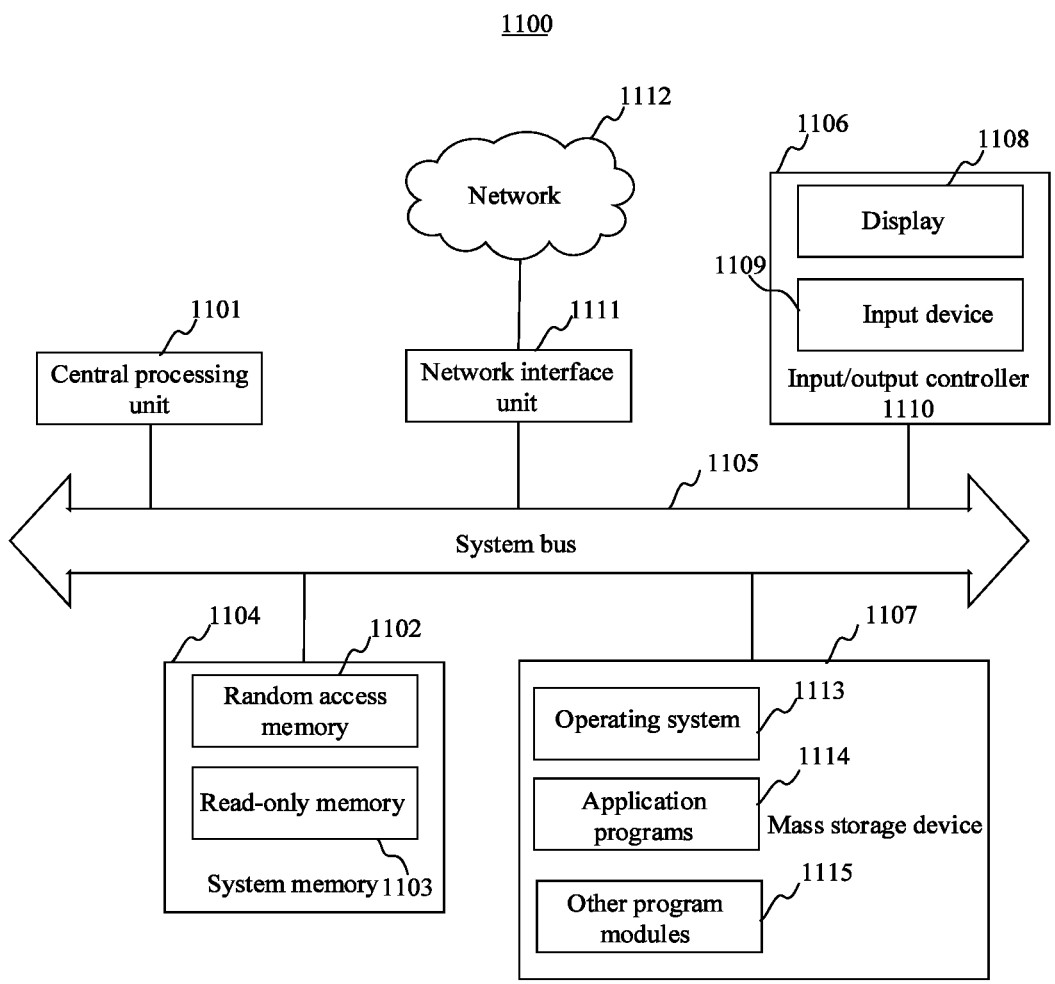
FIG. 11 is a schematic structural diagram of a server according to an embodiment of the present disclosure.

FIG. 11 shows a schematic structural diagram of a server according to an embodiment of the present disclosure. The server is configured to perform the method for detecting a yaw-to-wind abnormality provided in the above embodiments.

Specifically, the server 1100 includes a CPU 1101, a system memory 1104 including a random access memory (RAM) 1102 and a read-only memory (ROM) 1102, and a system bus connecting the system memory 1104 and the central processing unit 1101 1105. The server 1100 also includes a basic input/output (I/O) system 1106 that helps to transfer information between various devices in the computer, and a mass storage device 1107 for storing an operating system 1113, application programs 1114, and other program modules 1112.

The basic input/output system 1106 includes a display 1108 for displaying information and an input device 1109 such as a mouse and a keyboard for a user to input information. The display 1108 and the input device 1109 are both connected to the central processing unit 1101 through an input and output controller 1110 connected to the system bus 1105. The basic input/output system 1106 may further include an input and output controller 1110 for receiving and processing input from multiple other devices such as a keyboard, a mouse, or an electronic stylus. Similarly, the input and output controller 1110 also provides output to a display screen, a printer, or other types of output devices.

The mass storage device 1107 is connected to the central processing unit 1101 through a mass storage controller (not shown) connected to the system bus 1105. The mass storage device 1107 and its associated computer-readable medium provide non-volatile storage for the server 1100. That is, the mass storage device 1107 may include a computer-readable medium (not shown) such as a hard disk or a CD-ROM drive.

Without loss of generality, the computer-readable medium may include computer storage medium and communication medium. The computer storage medium includes volatile and nonvolatile, removable and non-removable medium implemented in any method or technology for storing information such as computer-readable instructions, data structures, program modules or other data. The computer storage medium include a RAM, a ROM, an erasable programmable read-only memory (EPROM), an electrically erasable programmable read-only memory (EEPROM), a flash memory or other solid state storage technologies, a CD-ROM, a DVD or other optical storage, a tape cassette, a magnetic tape, a disk storage or other magnetic storage devices. Those skilled in the art may know that the computer storage medium is not limited to the above. The system memory 1104 and the mass storage device 1107 may be collectively referred to as memory.

According to various embodiments of the present disclosure, the server 1100 may also be connected to a remote computer to run over a network such as the Internet. That is, the server 1100 may be connected to a network 1112 by a network interface unit 1111 connected to the system bus 1105. In other words, the network interface unit 1111 may also be used to connect to other types of networks or remote computer systems (not shown).

The memory also includes at least one instruction, at least one program, a code set, or an instruction set. The at least one instruction, at least one program, code set, or instruction set is stored in the memory and configured to be used by one or more processors to implement the method for detecting a yaw-to-wind abnormality.

In an exemplary embodiment, a computer device is also provided. The computer device may be a terminal or a server. The computer device includes a processor and a memory. The memory stores at least one instruction, at least one program, a code set, or an instruction set. The at least one instruction, the at least one program, the code set, or the instruction set, when loaded and executed by the processor, causes the processor to perform the method for detecting a yaw-to-wind abnormality.

In an exemplary embodiment, a computer-readable storage medium is also provided. The computer-readable storage medium stores at least one computer program including at least one instruction, at least one program, a code set, or an instruction set. The at least one instruction, the at least one program, the code set, or the instruction set, when loaded and executed by a processor, causes the processor to perform the method for detecting a yaw-to-wind abnormality.

It should be understood that the term "a plurality of" mentioned herein refers to two or more, and the term "and/or" describes an association relationship of associated objects, indicating that there may be three types of relationships. For example, A and/or B may indicate three situations, i.e., A exists alone, A and B exist simultaneously, and B exists alone. The character "/" generally indicates that the associated objects are in an "or" relationship.

The above are just exemplary embodiments of the present invention, which will not limit the present disclosure. Any modifications, equivalent replacements and improvements made within the spirits and principles of the present disclosure shall all fall in the protection scope of the present disclosure.

What is claimed is:

1. A method for detecting a yaw-to-wind abnormality, comprising:
    (a) acquiring a wind direction deviation angle within a specified time period, wherein the wind direction deviation angle is an angle defined between a wind direction and a central axis of a nacelle of a wind turbine;
    (b) calculating a power performance index, wherein the power performance index is a dimensionless number to characterize power generation performance of the wind turbine; determining an optimal wind direction deviation angle based on the power performance index,
        (i) wherein the optimal wind direction deviation angle is a wind direction deviation angle corresponding to optimal power generation performance of the wind turbine within the specified time period; and
        (ii) wherein determining the optimal deviation angle based on the power performance index comprises:
            (1) dividing the wind direction deviation angle into m angular intervals, wherein m is a positive integer greater than 1, and each angular interval comprises at least one wind direction deviation angle, wherein the wind direction deviation angle one-to-one corresponds to the power performance index;
            (2) calculating an average value of power performance indices of an $i^{th}$ angular interval among the m angular intervals:
            (3) determining a confidence interval corresponding to the $i^{th}$ angular interval based on the average value and a preset confidence probability;
            (4) comparing lower boundary values of confidence intervals corresponding to the m angular intervals:
            (5) determining an angular interval corresponding to a confidence interval with a maximum lower boundary value as an optimal angular interval, wherein the optimal angular interval is an angular interval which the optimal deviation angle falls within; and
            (6) determining a lower boundary value of the optimal angular interval as the optimal deviation angle,
    (c) determining a current wind direction deviation angle according to probability distribution of the wind direction deviation angle, wherein the current wind direction deviation angle is a wind direction deviation angle with a greatest probability of occurrence within the specified time period; and
    (d) determining that the yaw-to-wind abnormality is detected if a difference between the optimal wind direction deviation angle and the current wind direction deviation angle is greater than a preset threshold.

2. The method according to claim 1, wherein before acquiring the wind direction deviation angle, the method further comprises:
    acquiring raw data of the wind turbine within the specified time period, wherein the raw data of the wind turbine comprises operating data of the wind turbine, environmental data of the wind turbine, and operating data of adjacent wind turbines, wherein the operating data of the wind turbine comprises a raw output power of the wind turbine; and
    calculating the power performance index comprises:
        extracting data characteristics of the raw data of the wind turbine;
        acquiring an expected output power of the wind turbine based on the data characteristics of the raw data of the wind turbine by invoking a power regression model; and
        acquiring the power performance index based on the expected output power of the wind turbine and the raw output power of the wind turbine.

3. The method according to claim 2, wherein after acquiring the raw data of the wind turbine, the method further comprises:
    acquiring cleaned data by cleaning the raw data of the wind turbine, wherein the cleaning is to remove abnormal data in the raw data of the wind turbine, and the abnormal data comprises at least one of: stuck data, overrun data, and data that does not conform to physical principles; and
    acquiring the expected output power of the wind turbine based on the data characteristics of the raw data of the wind turbine by invoking the power regression model if a data volume of the cleaned data is greater than a preset data volume.

4. The method according to claim 3, wherein acquiring the cleaned data by cleaning the raw data of the wind turbine comprises:
    acquiring the cleaned data by single-point cleaning the raw data of the wind turbine, wherein in the single-point leaning, only target data is taken into consideration in detecting whether the target data is abnormal; and/or
    acquiring the cleaned data by multi-point cleaning the raw data of the wind turbine, wherein in the multi-point cleaning, both target data and at least one piece of other data are taken into consideration in detecting whether the target data is abnormal.

5. The method according to claim 1, wherein determining the current wind direction deviation angle according to the probability distribution of the wind direction deviation angle comprises:

determining an angular interval with a maximum probability value among the m angular intervals as the current deviation angle; or determining an angular interval corresponding to a median of the wind direction deviation angles of the m angular intervals as the current deviation angle.

6. The method according to claim 1, wherein after determining the current deviation angle, the method further comprises:

calculating a percentage of a data volume of the optimal angular interval; and determining whether the difference between the optimal deviation angle and the current deviation angle meets the preset threshold if the percentage is greater than a preset percentage.

7. An apparatus for detecting a yaw-to-wind abnormality, comprising:

(a) a deviation angle acquiring module, configured to acquire a wind direction deviation angle within a specified time period, wherein the wind direction deviation angle is an angle defined between a wind direction and a central axis of a nacelle of a wind turbine;

(b) an index calculating module, configured to calculate a power performance index, wherein the power performance index is a dimensionless number to characterize power generation performance of the wind turbine;

(c) a first determining module, configured to determine an optimal wind direction deviation angle based on the power performance index, (i) wherein the optimal wind direction deviation angle is a wind direction deviation angle corresponding to optimal power generation performance of the wind turbine within the specified time period; and (ii) wherein, to determine the optimal deviation angle based on the power performance index, the first determining module is configured to:

(1) divide the wind direction deviation angle into m angular intervals, wherein in is a positive integer greater than 1, and each angular interval comprises at least one wind direction deviation angle, wherein the wind direction deviation angle one-to-one corresponds to the power performance index;

(2) calculate an average value of power performance indices of an $i^{th}$ angular interval among the m angular intervals;

(3) determine a confidence interval corresponding to the $i^{th}$ angular interval based on the average value and a preset confidence probability;

(4) compare lower boundary values of confidence intervals corresponding to the m angular intervals;

(5) determine an angular interval corresponding to a confidence interval with a maximum lower boundary value as an optimal angular interval, wherein the optimal angular interval is an angular interval which the optimal deviation angle falls within; and (6) determine a lower boundary value of the optimal angular interval as the optimal deviation angle, (d) a second determining module, configured to determine a current wind direction deviation angle according to probability distribution of the wind direction deviation angle, wherein the current wind direction deviation angle is a wind direction deviation angle with a greatest probability of occurrence within the specified time period; and (e) a result determining module, configured to determine that a yaw-to-wind abnormality is detected if a difference between the optimal wind direction deviation angle and the current wind direction deviation angle is greater than a preset threshold.

8. A computer device, comprising a processor and a memory storing at least one instruction, at least one program, a code set or an instruction set therein, wherein the at least one instruction, the at least one program, the code set or the instruction set, when loaded and executed by the processor, causes the processor to perform steps of the method as defined in claim 1.

9. A non-transitory computer-readable storage medium storing at least one computer program therein, wherein the at least one computer program, when loaded and run by a processor, causes the processor to perform steps of the method as defined in claim 1.

* * * * *